(12) United States Patent
Yamashita et al.

(10) Patent No.: US 11,754,950 B2
(45) Date of Patent: Sep. 12, 2023

(54) CONVEYING DEVICE, FIXING DEVICE, AND IMAGE FORMING APPARATUS

(71) Applicant: FUJIFILM Business Innovation Corp., Tokyo (JP)

(72) Inventors: Masato Yamashita, Ebina (JP); Takayuki Yamashita, Ebina (JP); Yoshiki Shimodaira, Ebina (JP); Kosuke Yamada, Ebina (JP); Tetsuro Kodera, Ebina (JP); Mitsuhiro Matsumoto, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/532,617

(22) Filed: Nov. 22, 2021

(65) Prior Publication Data

US 2022/0082967 A1    Mar. 17, 2022

Related U.S. Application Data

(63) Continuation of application No. PCT/JP2019/050679, filed on Dec. 24, 2019.

(30) Foreign Application Priority Data

Jun. 28, 2019    (JP) .................................. 2019-122265

(51) Int. Cl.
*G03G 15/20*    (2006.01)
*B65G 39/02*    (2006.01)

(52) U.S. Cl.
CPC ......... *G03G 15/2028* (2013.01); *B65G 39/02* (2013.01)

(58) Field of Classification Search
CPC ........................... G03G 15/2028; B65G 39/02
See application file for complete search history.

(56) References Cited

U.S. PATENT DOCUMENTS

2005/0127595 A1    6/2005  Hendle et al.
2006/0056886 A1*   3/2006  Ohishi .................. B41J 13/025
                                                   399/328

(Continued)

FOREIGN PATENT DOCUMENTS

CN          1792753 A       6/2006
DE     102007006998 A1      9/2007

(Continued)

OTHER PUBLICATIONS

Mar. 17, 2020 Search Report issued in International Patent Application No. PCT/JP2019/050679.

(Continued)

*Primary Examiner* — Victor Verbitsky
(74) *Attorney, Agent, or Firm* — Oliff PLC

(57) ABSTRACT

A conveying device includes: a rotation part to which a holding part configured to hold a material to be conveyed is attached and configured to rotate in a circumferential direction to convey the material to be conveyed; a conveying roller that is provided with a recess for accommodating the holding part to convey the material to be conveyed; and a guide member including a guide portion configured to guide the material to be conveyed on a downstream side of the conveying roller, and a space in an intersecting direction intersecting the circumferential direction with respect to the guide portion, the space where the holding part moving by rotation of the rotation part passes through.

13 Claims, 12 Drawing Sheets

(56) References Cited

U.S. PATENT DOCUMENTS

| | | |
|---|---|---|
| 2006/0181013 A1 | 8/2006 | Kondo et al. |
| 2013/0230343 A1 | 9/2013 | Okamoto et al. |
| 2015/0309455 A1 | 10/2015 | Matsumoto |
| 2015/0344249 A1 | 12/2015 | Inoue et al. |
| 2015/0378301 A1 | 12/2015 | Nakamura |

FOREIGN PATENT DOCUMENTS

| | | |
|---|---|---|
| EP | 0722900 A2 | 7/1996 |
| JP | S50-012740 U | 2/1975 |
| JP | S52-120836 A | 10/1977 |
| JP | S54-055087 U | 4/1979 |
| JP | S57-063351 U | 4/1982 |
| JP | H03-004275 A | 1/1991 |
| JP | H03-031145 A | 2/1991 |
| JP | H07-225518 A | 8/1995 |
| JP | 2000-238400 A | 9/2000 |
| JP | 2002-137363 A | 5/2002 |
| JP | 2005-257968 A | 9/2005 |
| JP | 2006-259223 A | 9/2006 |
| JP | 2010-250162 A | 11/2010 |
| JP | 2011-112752 A | 6/2011 |
| JP | 2011-123273 A | 6/2011 |
| JP | 2011-175011 A | 9/2011 |
| JP | 2013-182265 A | 9/2013 |
| JP | 2014-172354 A | 9/2014 |
| JP | 2015-210351 A | 11/2015 |
| JP | 2018-194655 A | 12/2018 |

OTHER PUBLICATIONS

Mar. 17, 2020 Written Opinion issued in International Patent Application No. PCT/JP2019/050679.

Feb. 14, 2023 Office Action issued in Japanese Patent Application No. 2019-122265.

Mar. 9, 2023 Office Action issued in Australian Patent Application No. 2019454416.

Apr. 10, 2023 Office Action issued in Chinese Patent Application No. 201980097268.2.

Jun. 21, 2023 Office Action issued in European Patent Application No. 19934721.2.

\* cited by examiner

CONVEYING DEVICE, FIXING DEVICE, AND IMAGE FORMING APPARATUS

CROSS-REFERENCE TO RELATED APPLICATIONS

This is a continuation of International Application No. PCT/JP2019/050679 filed on Dec. 24, 2019, and claims priority from Japanese Patent Application No. 2019-122265 filed on Jun. 28, 2019.

BACKGROUND

Technical Field

The present invention relates to a conveying device, a fixing device, and an image forming apparatus.

Related Art

Patent Literature 1 discloses an inkjet recording apparatus that includes a chain gripper 64 that conveys a sheet P, a first sensor 102 that detects presence or absence of the sheet P at an entrance of a drying and fixing part, and a second sensor 104 that detects presence or absence of the sheet P at an outlet of the drying and fixing part. Plural sensor dogs 106 are arranged on a first sprocket 64A that moves the chain gripper 64 corresponding to positions for alternately detecting the part where the paper P is present and the part where the paper P is absent in the chain gripper 64. A first timing sensor 108 and a second timing sensor 110 detect passing of the sensor dog 106 is detected by, and detection timings of the first sensor and the second sensor are determined. In the disclosed inkjet recording apparatus (see FIG. 3 of Patent Literature 1), a system controller determines that a jam occurs when the presence of a sheet is continuously detected by the first sensor or the second sensor, and determines that a jam occurs when there is a mismatch in information on presence or absence of a sheet obtained by the first sensor and the second sensor.

Patent Literature 2 discloses a configuration (see FIG. 2 of Patent Literature 2) including a rotatable fixing roller 61 that heats a sheet P, an endless belt 62 that presses the fixing roller 61 to form a nip portion, and a peeling assisting member 70 that separates the sheet P, which passes the nip portion N and is peeled from the fixing roller 61, from the fixing roller 61. In the peeling assisting member 70, an end facing the fixing roller 61 (a side 71a on the fixing roller 61 side of a peeling baffle 71) is formed along a deflection curve of the fixing roller 61 in a longitudinal direction.

CITATION LIST

Patent Literature

Patent Literature 1: JP-A-2014-172354
Patent Literature 2: JP-A-2005-257968

SUMMARY

Here, for example, in a configuration in which a chain to which a holding part such as a gripper that holds a sheet is attached rotates in a rotation direction to convey the sheet and in which a guide member guides the sheet, the holding part and the guide member may interfere with each other.

Aspects of non-limiting embodiments of the present disclosure relate to suppressing interference between the holding part and the guide member, as compared with a configuration using a guide member without a space where a holding part passes through.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a conveying device including: a rotation part to which a holding part configured to hold a material to be conveyed is attached and configured to rotate in a circumferential direction to convey the material to be conveyed; a conveying roller that is provided with a recess for accommodating the holding part to convey the material to be conveyed; and a guide member comprising a guide portion configured to guide the material to be conveyed on a downstream side of the conveying roller, and a space in an intersecting direction intersecting the circumferential direction with respect to the guide portion, the space where the holding part moving by rotation of the rotation part to passes through.

BRIEF DESCRIPTION OF DRAWINGS

Exemplary embodiment(s) of the present invention will be described in detail based on the following figures, wherein.

DETAILED DESCRIPTION

Hereinafter, an example of an exemplary embodiment according to the present invention will be described with reference to the drawings.

Image Forming Apparatus 10

Figure 1:
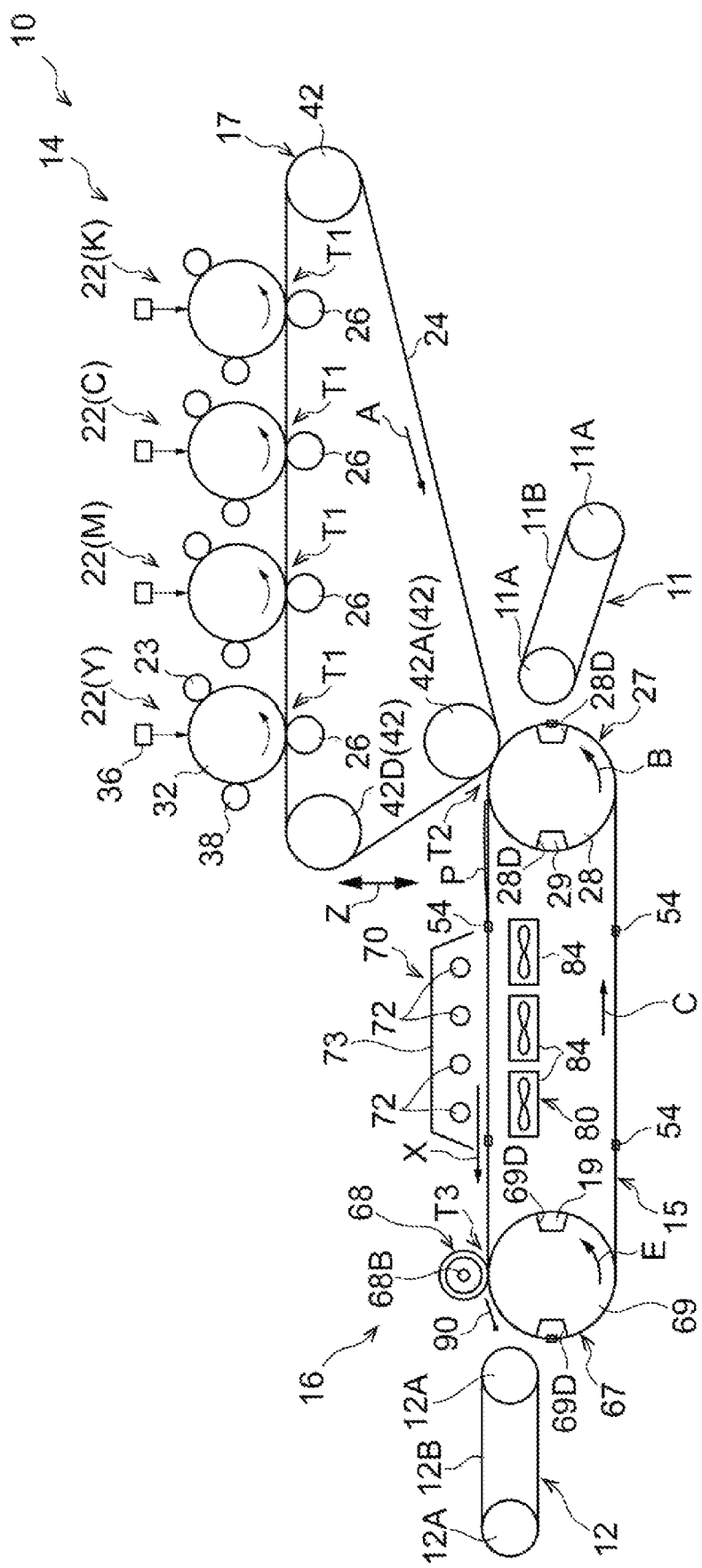
FIG. 1 is a schematic view illustrating an image forming apparatus according to an exemplary embodiment.

A configuration of an image forming apparatus 10 according to the present exemplary embodiment will be described. FIG. 1 is a schematic diagram illustrating the configuration of the image forming apparatus 10 according to the present exemplary embodiment.

The image forming apparatus 10 illustrated in FIG. 1 is an example of an image forming apparatus that forms an image on a recording medium. Specifically, the image forming apparatus 10 is an electrophotographic image forming apparatus that forms a toner image (an example of an image) on a recording medium P such as a sheet. More specifically, the image forming apparatus 10 includes an image forming unit 14, a first conveying body 11, a second conveying body 12, and a fixing device 16. Hereinafter, a configuration of each part (the image forming unit 14, the first conveying body 11, the second conveying body 12, and the fixing device 16) of the image forming apparatus 10 will be described.

Image Forming Unit 14

The image forming unit 14 is an example of a forming unit that forms an image on a recording medium. Specifically, the image forming unit 14 has a function of forming a toner image on a recording medium P serving as an example of a material to be conveyed. More specifically, the image forming unit 14 includes a toner image forming unit 22 and a transfer device 17.

Toner Image Forming Unit 22

The toner image forming unit 22 illustrated in FIG. 1 has a function of forming a toner image. Plural toner image forming units 22 are provided so as to form a toner image for each color. In the present exemplary embodiment, toner image forming units 22 of a total of four colors of yellow (Y), magenta (M), cyan (C), and black (K) are provided. The (Y), (M), (C), and (K) illustrated in FIG. 1 indicate constituent portions corresponding to the respective colors.

Since the toner image forming unit 22 of each color has the same configuration except for the toner to be used, on behalf of the toner image forming unit 22 of each color, each part of the toner image forming unit 22(Y) is denoted by a reference numeral in FIG. 1.

Specifically, the toner image forming unit 22 of each color includes a photosensitive drum 32 (photoconductor) that rotates in one direction (for example, in a counterclockwise direction in FIG. 1). The toner image forming unit 22 of each color includes a charger 23, an exposure device 36, and a developing device 38.

In the toner image forming unit 22 of each color, the charger 23 charges the photosensitive drum 32. The exposure device 36 exposes the photosensitive drum 32 charged by the charger 23 to form an electrostatic latent image on the photosensitive drum 32. The developing device 38 develops the electrostatic latent image, which is formed on the photosensitive drum 32 by the exposure device 36, to form a toner image.

Transfer Device 17

The transfer device 17 illustrated in FIG. 1 is a device that transfers the toner image formed by the toner image forming unit 22 onto the recording medium P. Specifically, the transfer device 17 primarily transfers the toner images of the photosensitive drums 32 of the respective colors onto a transfer belt 24 serving as an intermediate transfer body, and secondarily transfers the superposed toner images onto the recording medium P at a secondary transfer position T2. More specifically, as illustrated in FIG. 1, the transfer device 17 includes the transfer belt 24, primary transfer rollers 26, a secondary transfer body 27, and an opposing roller 42A.

Primary Transfer Roller 26

Each of the primary transfer rollers 26 illustrated in FIG. 1 is a roller that transfers the toner image of the photosensitive drum 32 of each color to the transfer belt 24 at a primary transfer position T1 between the photosensitive drum 32 and the primary transfer roller 26. In the present exemplary embodiment, the toner image formed on the photosensitive drum 32 is transferred to the transfer belt 24 at the primary transfer position T1 by applying a primary transfer electric field between the primary transfer roller 26 and the photosensitive drum 32.

Transfer Belt 24

The toner images are transferred from the photosensitive drums 32 of the respective colors to an outer circumferential surface of the transfer belt 24 illustrated in FIG. 1. Specifically, the transfer belt 24 is configured as follows. As illustrated in FIG. 1, the transfer belt 24 has an annular shape. The transfer belt 24 is wound around plural rollers 42 including a driving roller 42D and the opposing roller 42A, and a posture of the transfer belt 24 is determined. For example, among the plural rollers 42, the driving roller 42D is driven to rotate by a driving unit (not illustrated), so that the transfer belt 24 rotates in a predetermined direction indicated by an arrow A.

Secondary Transfer Body 27 and Opposing Roller 42A

Figure 2:
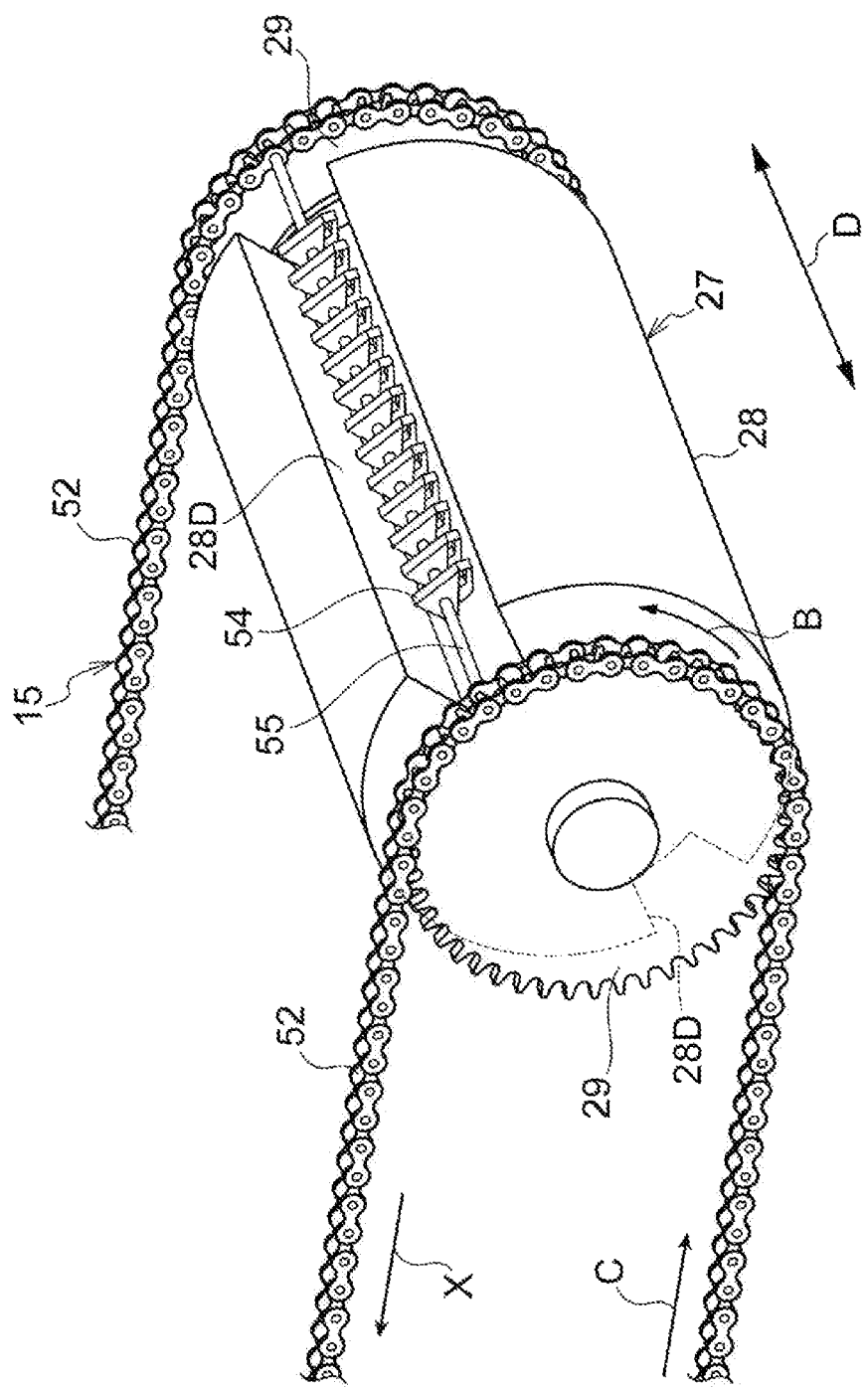
FIG. 2 is a perspective view illustrating a part of a secondary transfer body and a conveying part according to the present exemplary embodiment.

The secondary transfer body 27 illustrated in FIG. 1 has a function of transferring a toner image onto the recording medium P. Specifically, as illustrated in FIG. 2, the secondary transfer body 27 includes a transfer cylinder 28 and a pair of sprockets 29. The secondary transfer body 27 is driven to rotate in a direction indicated by an arrow B by a driving unit (not illustrated).

As illustrated in FIG. 1, the transfer cylinder 28 and the opposing roller 42A are disposed to face each other with the transfer belt 24 interposed therebetween. In the present exemplary embodiment, the secondary transfer position T2 at which the toner image is transferred from the transfer belt 24 to the recording medium P is formed between the transfer cylinder 28 and the opposing roller 42A. When a secondary transfer electric field is applied between the transfer cylinder 28 and the opposing roller 42A, the toner image primarily transferred to the transfer belt 24 is transferred to the recording medium P at the secondary transfer position T2.

As illustrated in FIG. 2, plural (specifically, two) recesses 28D, in which grippers 54 and an attachment member 55 of a conveying part 15 to be described later are accommodated, are formed on an outer circumference of the transfer cylinder 28. The number of the recesses 28D may be determined according to an arrangement interval of the grippers 54 along a rotation direction C of a chain 52 to be described later, and the number of the recesses 28D may be one or three or more.

As illustrated in FIG. 2, the pair of sprockets 29 are disposed on both axial ends of the transfer cylinder 28, and a pair of chains 52, which will be described later, are wound around the sprockets 29. The pair of sprockets 29 are disposed coaxially with the transfer cylinder 28 and rotate integrally with the transfer cylinder 28.

First Conveying Body 11 and Second Conveying Body 12

The first conveying body 11 illustrated in FIG. 1 is a conveying body that conveys the recording medium P to the conveying part 15 to be described later. Specifically, the first conveying body 11 has a function of conveying the recording medium P and transferring the recording medium P to the grippers 54 of the conveying part 15 to be described later. More specifically, the first conveying body 11 is configured with an annular conveying belt 11B wound around a pair of rollers 11A.

The second conveying body 12 illustrated in FIG. 1 is a conveying body that conveys the recording medium P conveyed from the conveying part 15 to be described later. Specifically, the second conveying body 12 has a function of receiving the recording medium P, from which holding by the grippers 54 of the conveying part 15 to be described later is released, and conveying the recording medium P. More specifically, the second conveying body 12 is configured with an annular conveying belt 12B wound around a pair of rollers 12A.

Fixing Device 16

The fixing device 16 illustrated in FIG. 1 is an example of a fixing device that fixes an image to a recording medium on which the image is formed by a forming unit. The fixing device 16 is also an example of a conveying device that conveys a material to be conveyed.

Specifically, the fixing device 16 is a device that fixes a toner image, which is transferred to the recording medium P by the transfer cylinder 28, to the recording medium P. More specifically, as illustrated in FIG. 1, the fixing device 16 includes a heating unit 70, an air blowing part 80, a pressing body 67, a heating roller 68, a conveying part 15, and a guide plate 90.

Pressing Body 67

Figure 3:
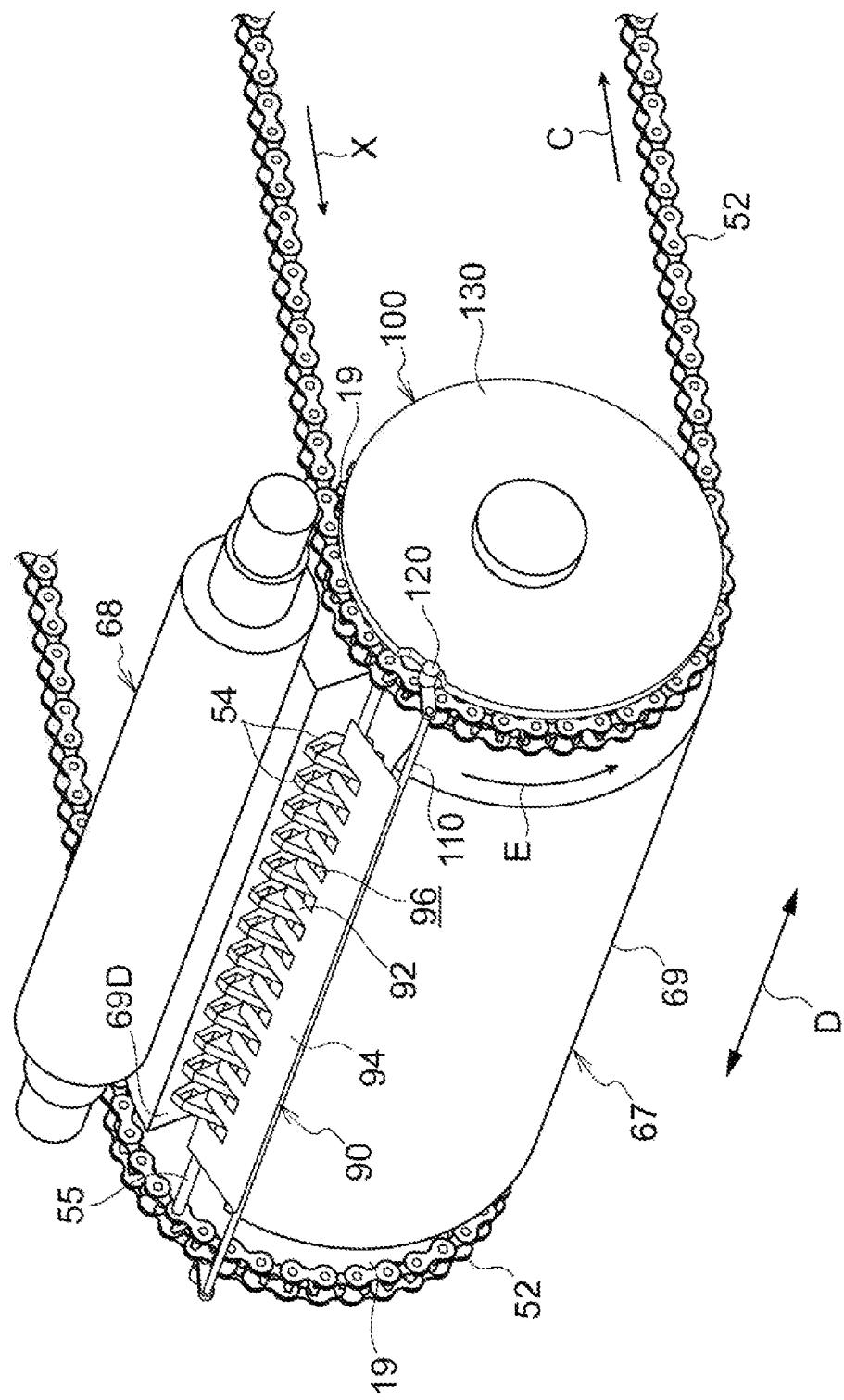
FIG. 3 is a perspective view illustrating a part of a pressing body, a heating roller, and the conveying part according to the present exemplary embodiment.

As illustrated in FIG. 3, the pressing body 67 includes a pressing roller 69 and a pair of sprockets 19. The pressing body 67 is driven to rotate in a direction of an arrow E by a driving unit (not illustrated).

The pressing roller 69 is an example of a conveying roller that is provided with a recess for accommodating a holding part to convey a material to be conveyed. The pressing roller 69 has a function of pressing the recording medium P by nipping the recording medium P between the pressing roller 69 and the heating roller 68. Plural (specifically, two, see FIG. 1) recesses 69D are formed on an outer circumference of the pressing roller 69, in which the grippers 54 and the attachment member 55 of the conveying part 15 are accommodated. The number of the recesses 69D may be determined according to the arrangement interval of the grippers 54 along the rotation direction C of the chain 52 to be described later, and the number of the recesses 69D may be one or three or more.

As illustrated in FIG. 3, the pair of sprockets 19 are disposed on both axial ends of the pressing roller 69, and the pair of chains 52, which will be described later, are wound around the pair of sprockets 19. The pair of sprockets 19 are disposed coaxially with the pressing roller 69, and rotate integrally with the pressing roller 69.

Heating Roller 68

The heating roller 68 is an example of a nip portion having a nip area configured to nip a material to be conveyed between the nip area and the conveying roller. The heating roller 68 is also an example of a fixing roller configured to nip the material to be conveyed between the fixing roller and the conveying roller to fix an image formed on the material to be conveyed. The heating roller 68 has a function of heating the recording medium P. Specifically, the heating roller 68 includes a heating source 68B such as a halogen lamp. The heating roller 68 includes a fixing area T3 (an example of a nip area) configured to nip the recording medium P between the heating roller 68 and the pressing roller 69. The heating roller 68 heats a toner image in a state where the recording medium P is nipped between the heating roller 68 and the pressing roller 69 at the fixing area T3, and fixes the toner image to the recording medium P.

Conveying Part 15

The conveying part 15 illustrated in FIG. 1 has a function of conveying the recording medium P in a conveying direction X (a direction indicted by an arrow X). Specifically, the conveying part 15 has a function of conveying the recording medium P from the secondary transfer position T2 to the fixing area T3 between the heating roller 68 and the pressing roller 69. The conveying direction X is a leftward direction in FIG. 1. Specifically, the conveying direction X is a horizontal direction. Therefore, the conveying part 15 is a conveying mechanism configured to convey the recording medium P in the horizontal direction.

More specifically, as illustrated in FIGS. 2 and 3, the conveying part 15 includes the pair of chains 52 and the grippers 54. The grippers 54 are an example of a holding part configured to hold the material to be conveyed. The pair of chains 52 are examples of a rotation part to which the holding part is attached and configured to rotate in a circumferential direction to convey the material to be conveyed. In FIG. 1, the chains 52 and the grippers 54 are illustrated in a simplified manner.

As illustrated in FIG. 1, the pair of chains 52 are formed in an annular shape. As illustrated in FIGS. 2 and 3, the pair of chains 52 are disposed at an interval in an apparatus depth direction D. Each of the pair of chains 52 is wound around the pair of sprockets 29 (see FIG. 2) of the secondary transfer body 27 and the pair of sprockets 19 (see FIG. 3) of the pressing body 67. When the secondary transfer body 27 having the pair of sprockets 29 and the pressing body 67 having the pair of sprockets 19 rotate, the chains 52 rotate in the rotation direction C (the direction indicated by the arrow C in FIGS. 1, 2, and 3).

As illustrated in FIGS. 2 and 3, the attachment member 55 to which the grippers 54 are attached is extended along the apparatus depth direction D on the pair of chains 52. Plural attachment members 55 are fixed to the pair of chains 52 at predetermined intervals along a circumferential direction (rotation direction C) of the chain 52.

Figure 4:
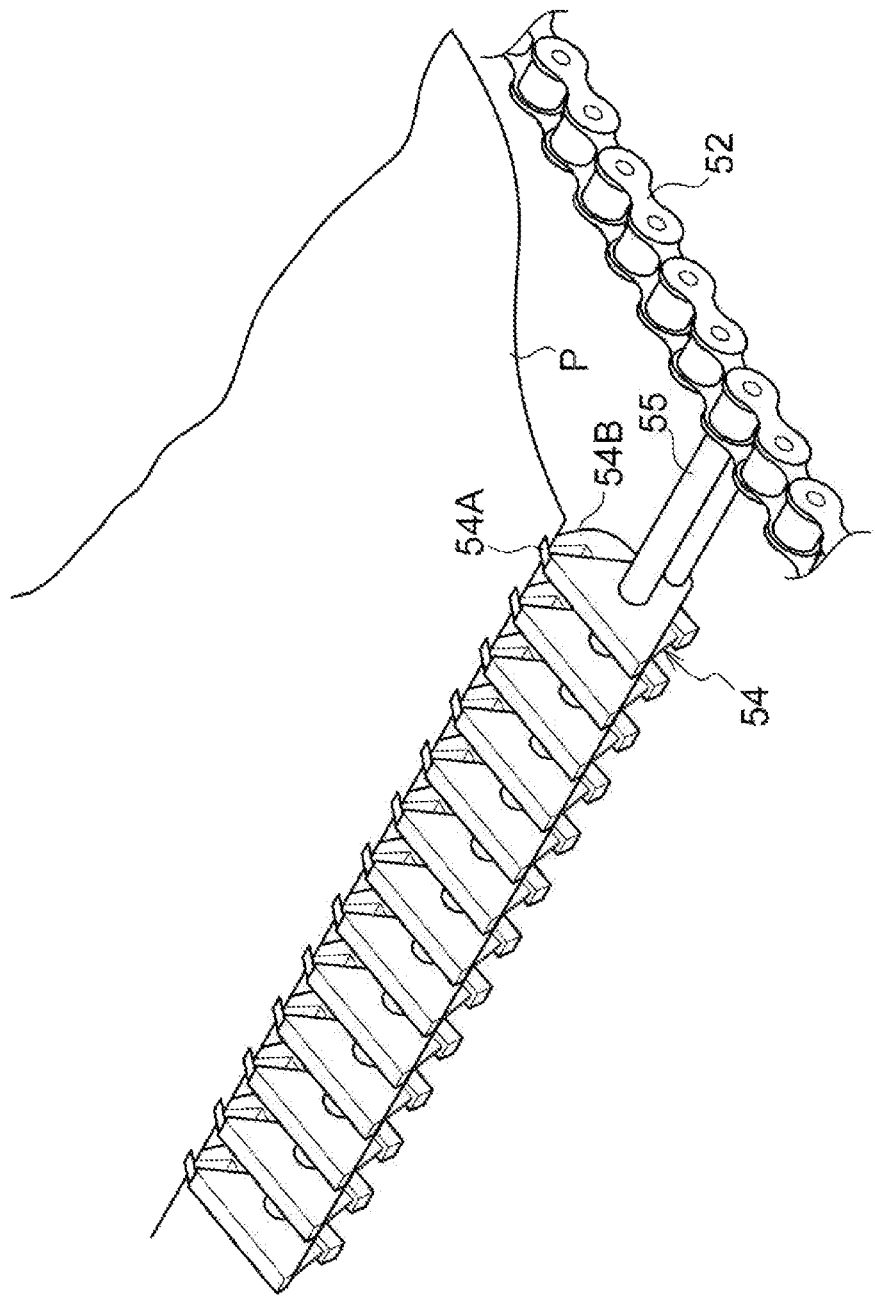
FIG. 4 is a perspective view illustrating a gripper according to the present exemplary embodiment.

Plural grippers 54 are attached to each attachment member 55 at predetermined intervals along the apparatus depth direction D. In other words, the grippers 54 are attached to the chains 52 via the attachment member 55. The gripper 54 has a function of holding a front end of the recording medium P. Specifically, as illustrated in FIG. 4, the gripper 54 includes a claw 54A and a claw base 54B. The claw 54A and the claw base 54B are disposed on an upstream side in the conveying direction of the gripper 54. That is, the claw 54A and the claw base 54B constitute a portion of the gripper 54 on the upstream side in the conveying direction. The claw 54A and the claw base 54B are an example of a holding portion configured to hold a material to be conveyed.

The gripper 54 includes the claw 54A and the claw base 54B, and holds the recording medium P by clamping the front end of the recording medium P between the claw 54A and the claw base 54B. In other words, it can be said that the gripper 54 is a gripping part configured to grip the recording medium P in a thickness direction thereof. The front end of the recording medium P is a downstream end of the recording medium P in the conveying direction X.

More specifically, the gripper 54 holds the front end of the recording medium P outside an image area of the recording medium P. The image area of the recording medium P is an area onto which a toner image is transferred in the recording medium P. In the gripper 54, for example, the claw 54A is pressed against the claw base 54B by a spring or the like, and the claw 54A is opened and closed with respect to the claw base 54B by action of a cam or the like.

Figure 5:
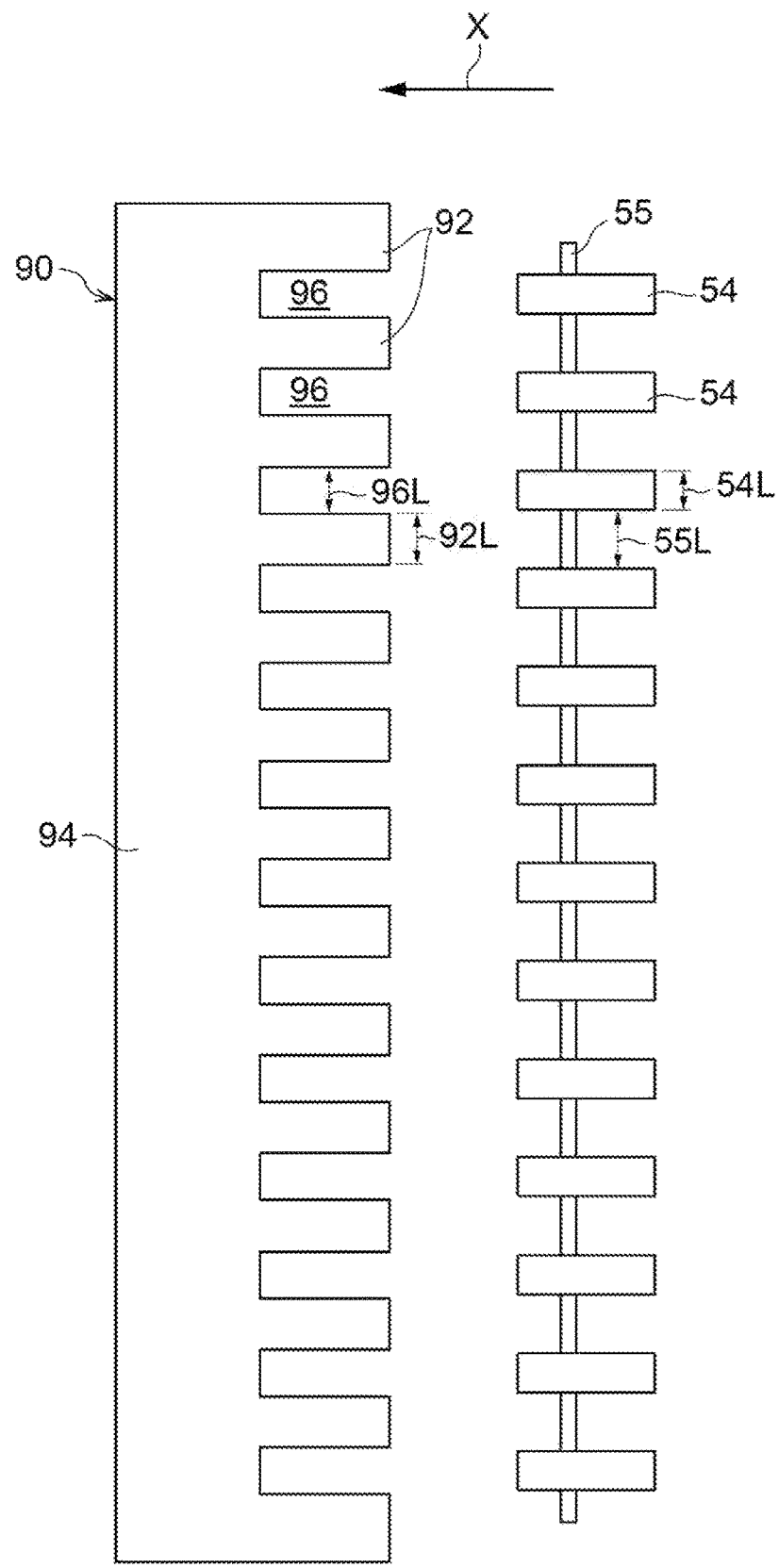
FIG. 5 is a plan view illustrating a guide plate according to the present exemplary embodiment.

A dimension (hereinafter referred to as a width) of each of the grippers 54 along the apparatus depth direction D is narrower than a width of the recording medium P. Therefore, the grippers 54 hold a part of the recording medium P in the apparatus depth direction D. As illustrated in FIGS. 3 and 5, the width of the gripper 54 is narrower than a width of the guide plate 90.

In the conveying part 15, as illustrated in FIG. 4, the front end of the recording medium P sent from the first conveying body 11 is held by the gripper 54. In the conveying part 15, as illustrated in FIG. 1, when the chain 52 rotates in the rotation direction C in a state where the gripper 54 holds the front end of the recording medium P, the gripper 54 is moved to convey the recording medium P, and the recording medium P is caused to pass through the secondary transfer position T2 together with the gripper 54 with the recording medium P being held by the gripper 54. At a portion where the chain 52 is wound around the sprocket 29, the gripper 54 moves integrally with the transfer cylinder 28 in the rotation direction (B direction) of the transfer cylinder 28 in a state where the gripper 54 is accommodated in the recess 28D of the transfer cylinder 28.

In the conveying part 15, after the recording medium P is caused to pass through the secondary transfer position T2, the recording medium P is further caused to pass through the fixing area T3 together with the gripper 54 in a state of being held by the gripper 54. At the portion where the chain 52 is wound around the sprocket 19, the gripper 54 moves integrally with the pressing roller 69 in the rotation direction (E direction) of the pressing roller 69 in a state of being accommodated in the recess 69D of the pressing roller 69.

Heating Unit 70

The heating unit 70 illustrated in FIG. 1 has a function of heating the recording medium P, which is conveyed in the conveying direction X by the conveying part 15, in a non-contact manner. Specifically, the heating unit 70 pre-heats an unfixed toner image formed on a surface of the recording medium P in a non-contact manner. More specifically, the heating unit 70 includes a heater 72 and a reflection plate 73.

The heater 72 is a heating member that heats the recording medium P in a non-contact manner with respect to the recording medium P conveyed in the conveying direction X by the conveying part 15. More specifically, the heater 72 is configured as follows.

That is, as illustrated in FIG. 1, plural heaters 72 are disposed at intervals along the conveying direction X. The heater 72 is configured with a cylindrical infrared heater having a length in the apparatus depth direction D. The heater 72 generates heat by a filament (not illustrated) provided therein, and heats the recording medium P by radiant heat of the filament. In the present exemplary embodiment, as illustrated in FIG. 1, four heaters 72 are provided, but the number of heaters 72 is not limited to four.

The reflection plate 73 has a function of reflecting infrared rays from the heater 72 to a device lower side (that is, a side of the recording medium P conveyed by the conveying part 15). Specifically, the reflection plate 73 is formed in a box shape with the device lower side opened. The reflection plate 73 is formed using, for example, a metal plate such as an aluminum plate.

Air-Blowing Part 80

The air-blowing part 80 illustrated in FIG. 1 faces the heating unit 70 in an up-down direction Z on a side (that is, the lower side) opposite to a heating unit 70 side (that is, an upper side) with respect to the recording medium P conveyed by the conveying part 15.

Specifically, the air-blowing part 80 has a function of blowing air to a lower surface of the recording medium P conveyed by the conveying part 15. More specifically, the air-blowing part 80 has a function of lifting the recording medium P by blowing air to the recording medium P to maintain a non-contact state with respect to the recording medium P, such that the recording medium P is conveyed by the conveying part 15 in a state where the air-blowing part 80 is in the non-contact state with respect to a back surface opposite to the surface of the recording medium P on which an unfixed image is formed.

More specifically, the air-blowing part 80 includes plural air blowers 84 arranged along the conveying direction X. The plural air blowers 84 send air upward and blow the air against the lower surface of the recording medium P to float the recording medium P. As an example, an axial blower that blows air in an axial direction is used as the air blower 84. As the air blower 84, a centrifugal blower that blows air toward a centrifugal direction, such as a multi-blade blower (for example, a sirocco fan), may be used.

Guide Plate 90

Figure 6:
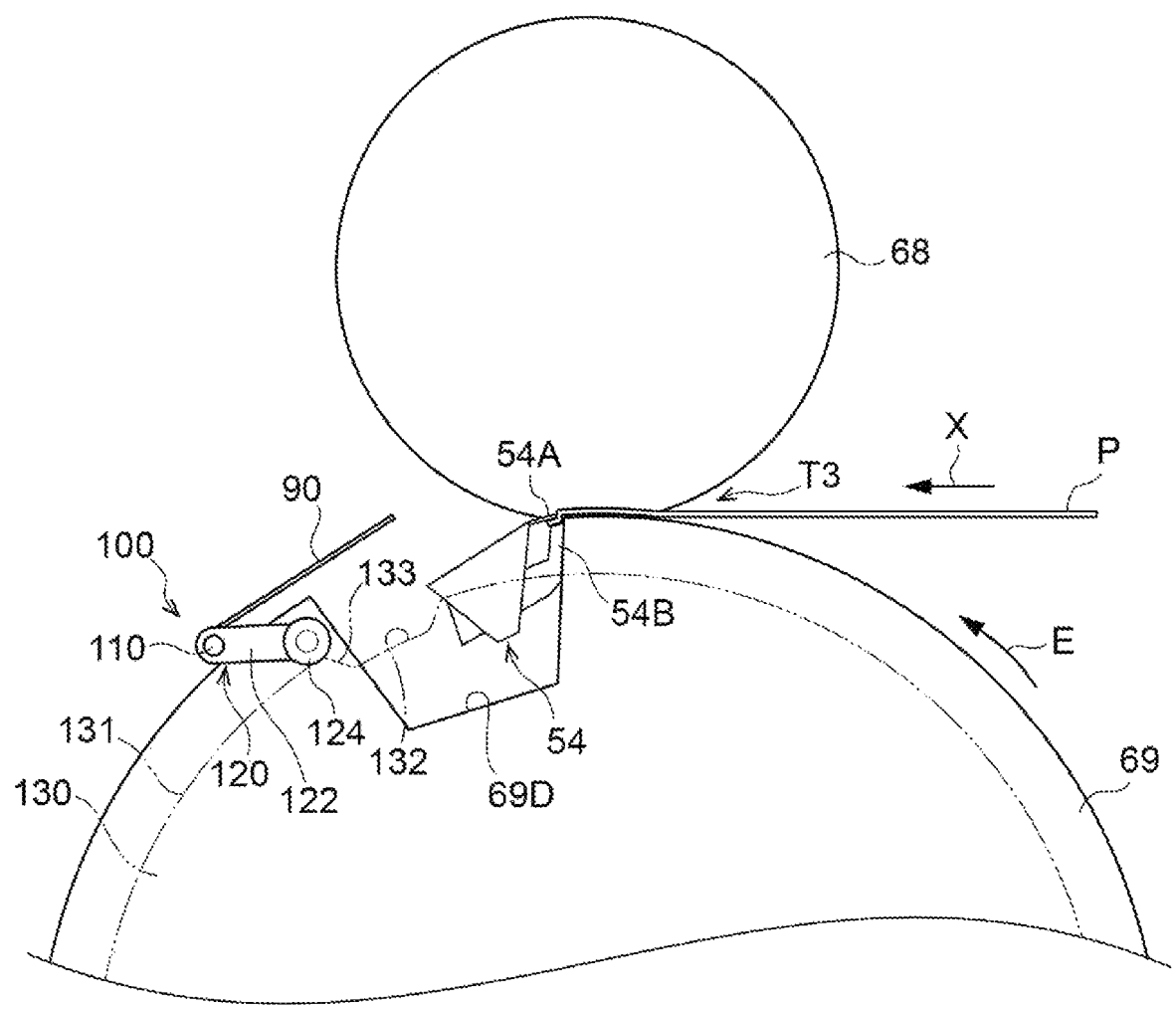
FIG. 6 is an operation diagram illustrating an operation of the guide plate and the gripper according to the present exemplary embodiment.

The guide plate 90 illustrated in FIGS. 3, 5, and 6 is an example of a guide member. As illustrated in FIG. 6, the guide plate 90 is disposed on a downstream side in the conveying direction with respect to the fixing area T3. That is, the guide plate 90 is disposed on the downstream side in the conveying direction with respect to the heating roller 68 and the pressing roller 69.

The guide plate 90 has a function of guiding the recording medium P that is conveyed from the fixing area T3 to the downstream side in the conveying direction. The guide plate 90 also functions as a peeling plate that peels the recording medium P, which is conveyed from the fixing area T3, from the pressing roller 69.

Specifically, as illustrated in FIG. 5, the guide plate 90 includes plural guide portions 92 and plural connecting portions 94. The guide portion 92 is a portion that guides the recording medium P on the downstream side of the pressing roller 69. The plural guide portions 92 are arranged along the apparatus depth direction D with a gap 96 (an example of a space) between adjacent guide portions. Each of the guide portions 92 is formed in a rectangular shape.

Plural gaps 96 are provided at intervals in the apparatus depth direction D with respect to the guide portion 92. The apparatus depth direction D is an example of an intersecting direction intersecting the rotation direction.

As illustrated in FIG. 5, an interval 96L between adjacent guide portions 92 is wider than a width 54L of the gripper 54. A width 92L of the guide portion 92 is narrower than a width 55L between adjacent grippers 54. The width 92L of the guide portion 92 is wider than the interval 96L between adjacent guide portions 92. The width 92L of the guide portion 92 may be narrower than the interval 96L between adjacent guide portions 92, or may be the same as the interval 96L between adjacent guide portions 92.

The connecting portion 94 connects the plural guide portions 92 in the apparatus depth direction D, on a downstream side of the plural guide portions 92. The connecting portion 94 and the plural guide portions 92 are integrally formed. That is, the connecting portion 94 and the plural guide portions 92 are formed of one component. The connecting portion 94 and the plural guide portions 92 are formed in a comb shape in a plan view. The guide plate 90 has a length in the apparatus depth direction D. It can be said that the guide plate 90 is formed in a rectangular shape in which cutouts for forming the gaps 96 are provided.

In the guide plate 90, as illustrated in FIG. 3, the gripper 54 that moves by the rotation of the chain 52 passes through the gap 96 between the guide portions 92. In other words, the gap 96 is a part of a movement path of the gripper 54 that moves by the rotation of the chain 52. Further, in other words, the gripper 54 passes, by the rotation of the chain 52, at a position overlapping the guide portion 92 as viewed in the apparatus depth direction D, which is a position shifted to a side of the apparatus depth direction D with respect to the guide portion 92.

Release of Holding by Gripper 54

Figure 8:
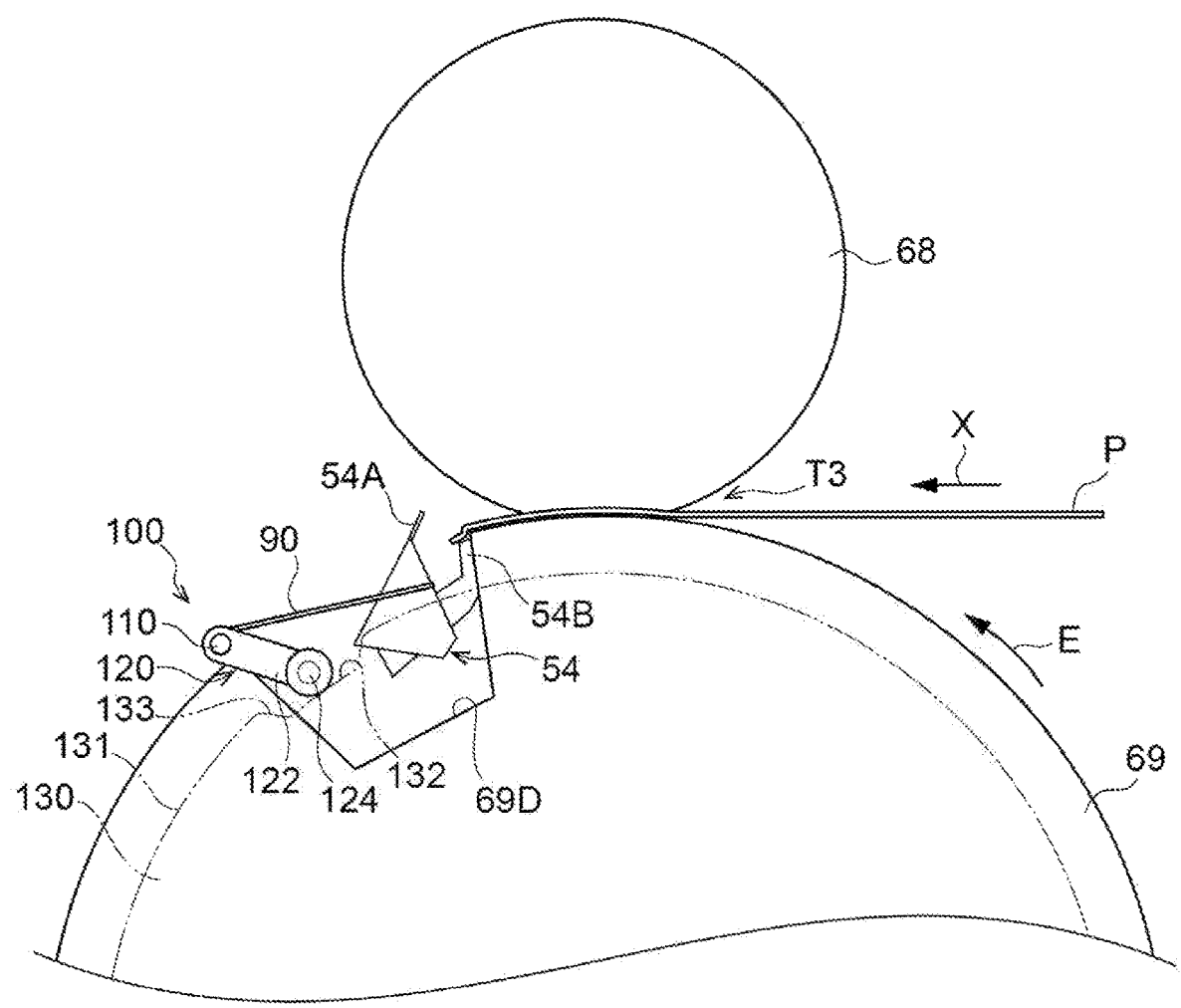
FIG. 8 is an operation diagram illustrating an operation of the guide plate and the gripper according to the present exemplary embodiment.

In the present exemplary embodiment, at the following timing, the claw 54A is opened with respect to the claw base 54B by the action of the cam or the like, and holding of the recording medium P by the gripper 54 is released. That is, as illustrated in FIG. 8, after the front end of the recording medium P passes through the fixing area T3, the gripper 54 releases the holding of the recording medium P. That is, after passing through the fixing area T3 together with the front end of the recording medium P while holding the recording medium P, the gripper 54 releases the holding of the recording medium P. In other words, the gripper 54 releases the holding of the recording medium P after a portion held by the gripper 54 in the recording medium P passes through the fixing area T3.

Specifically, the gripper 54 releases the holding of the recording medium P before the claw 54A and the claw base 54B pass through the gap 96 between the guide portions 92 of the guide plate 90. More specifically, the holding of the recording medium P is released after a portion of the gripper 54 except for the claw 54A and the claw base 54B (that is, a portion of the gripper 54 on a downstream side in the conveying direction) enters the gap 96. The gripper 54 releases the holding of the recording medium P before the guide plate 90 and the recording medium P overlap each other in the up-down direction.

Moving Mechanism 100

A moving mechanism 100 illustrated in FIGS. 3 and 6 is a mechanism configured to move the guide plate 90. Specifically, the moving mechanism 100 includes a shaft portion 110, cam followers 120, and cams 130.

The shaft portion 110 extends along the apparatus depth direction D, and is rotatably supported by a frame (not illustrated) serving as a support body of the fixing device 16. A downstream end of the guide plate 90 in a conveying direction is fixed to the shaft portion 110. Therefore, the guide plate 90 is configured to rotate about the downstream end in the conveying direction.

As illustrated in FIG. 6, the cam follower 120 includes an arm portion 122 that extends from both axial ends of the shaft portion 110, and a roller portion 124 that is rotatably attached to the arm portion 122. Specifically, the arm portion 122 extends from the shaft portion 110 toward an upstream side in the conveying direction, under the guide plate 90. The roller portion 124 is rotatably attached to a tip end portion of the arm portion 122.

The cams 130 are fixed to both axial end portions of the pressing body 67. Accordingly, the cams 130 rotate integrally with the pressing body 67. A recess 133 is formed in an outer circumferential portion of each cam 130. Accordingly, the cam 130 includes a first cam surface 131 serving as an outer circumferential surface and a second cam surface 132 serving as a bottom surface of the recess 133 having a shorter distance from a rotation shaft than the first cam surface 131.

The roller portion 124 of the cam follower 120 is in contact with an outer periphery of the cam 130 having the first cam surface 131 and the second cam surface 132 by at least one of an elastic force of a spring or the like and gravity.

The guide plate 90 swings when a position with which the roller portion 124 comes into contact changes between the first cam surface 131 and the second cam surface 132. At a position where the roller portion 124 comes into contact with the first cam surface 131 (see FIGS. 6 and 10), a tip end of the guide plate 90 is located on an outer side in a radial direction with respect to an outer circumferential surface of the pressing roller 69 (hereinafter, this position is referred to as an "outer position"). At a position where the roller portion 124 comes into contact with the second cam surface 132 (see FIGS. 7, 8, and 9), the tip end of the guide plate 90 is located on an inner side in the radial direction with respect to the outer circumferential surface of the pressing roller 69 (hereinafter, this position is referred to as an "inner position").

In the present exemplary embodiment, a position of the second cam surface 132 in a circumferential direction in the cam 130 is set such that the guide plate 90 performs the following operation.

Figure 7:
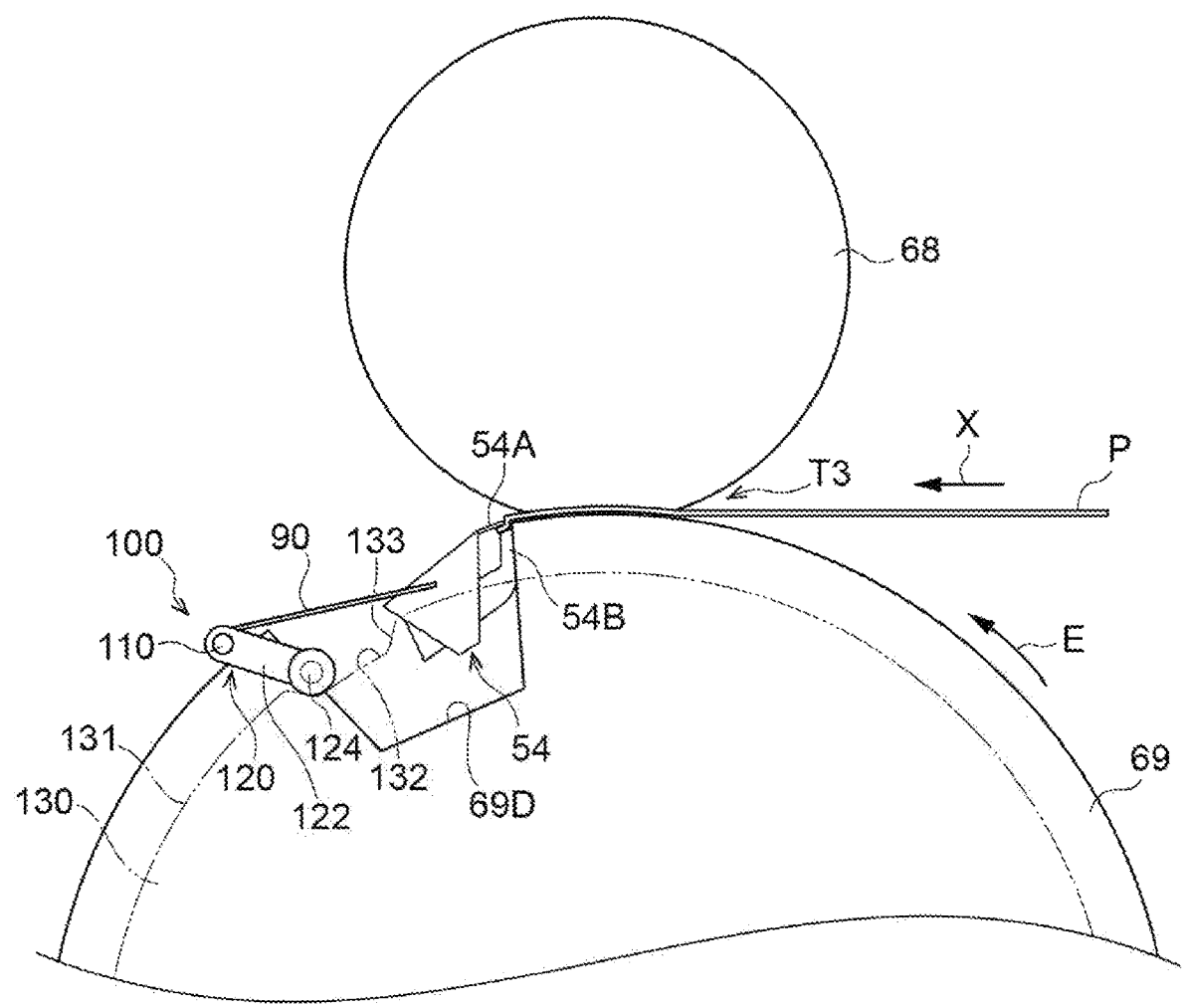
FIG. 7 is an operation diagram illustrating an operation of the guide plate and the gripper according to the present exemplary embodiment.

That is, as illustrated in FIG. 6, when the recess 69D moves to a position below the guide plate 90 by the rotation of the pressing roller 69, the guide plate 90 moves to the inner position and enters the recess 69D as illustrated in FIG. 7. In other words, the guide plate 90 enters the recess 69D in a state where the recess 69D of the pressing roller 69 is located at the position below the guide plate 90 (the position illustrated in FIG. 7). The position illustrated in FIG. 7 can also be said to be a position where the recess 69D is located on the downstream side in the conveying direction of the fixing area T3.

Figure 9:
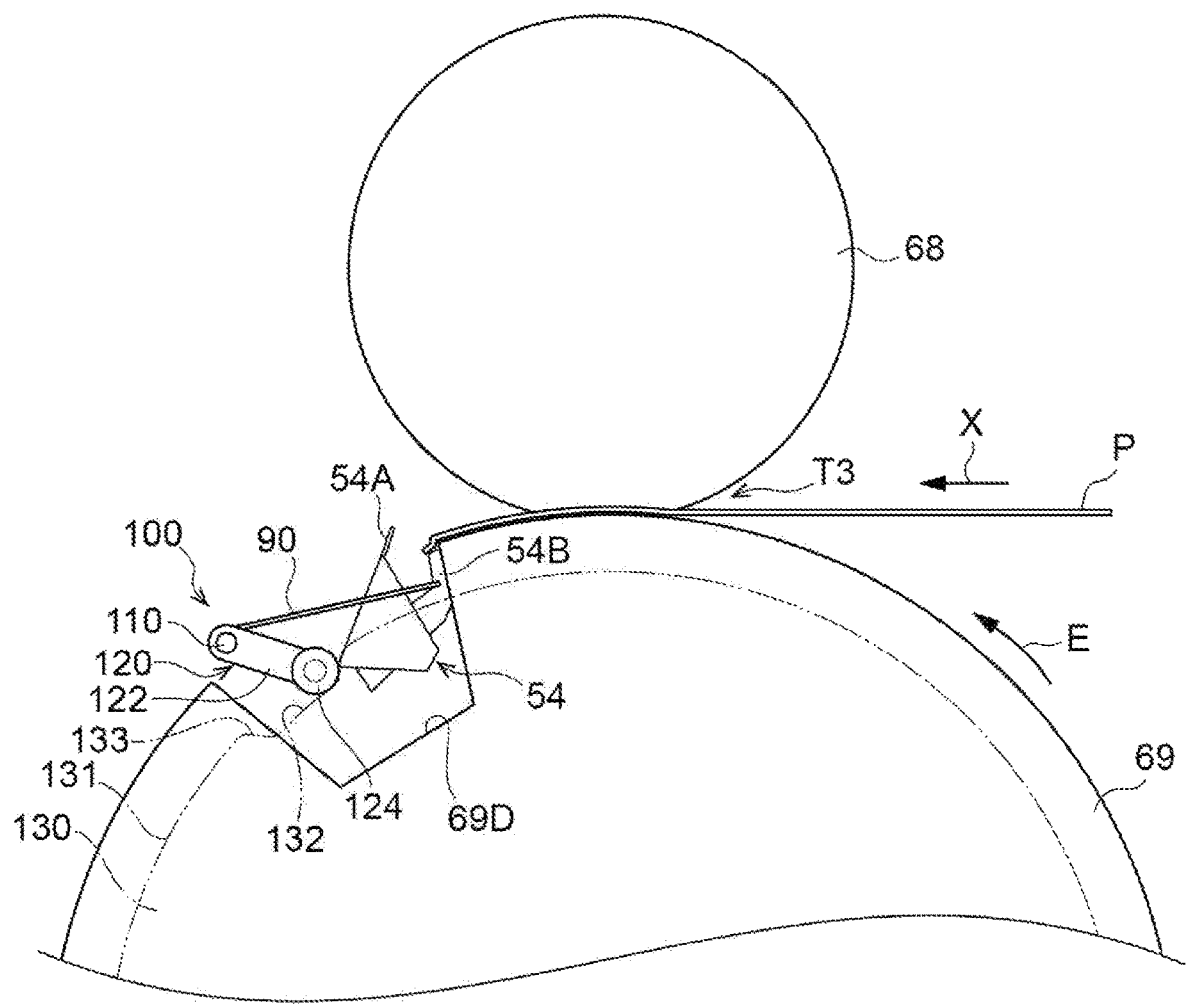
FIG. 9 is an operation diagram illustrating an operation of the guide plate and the gripper according to the present exemplary embodiment.
Figure 10:
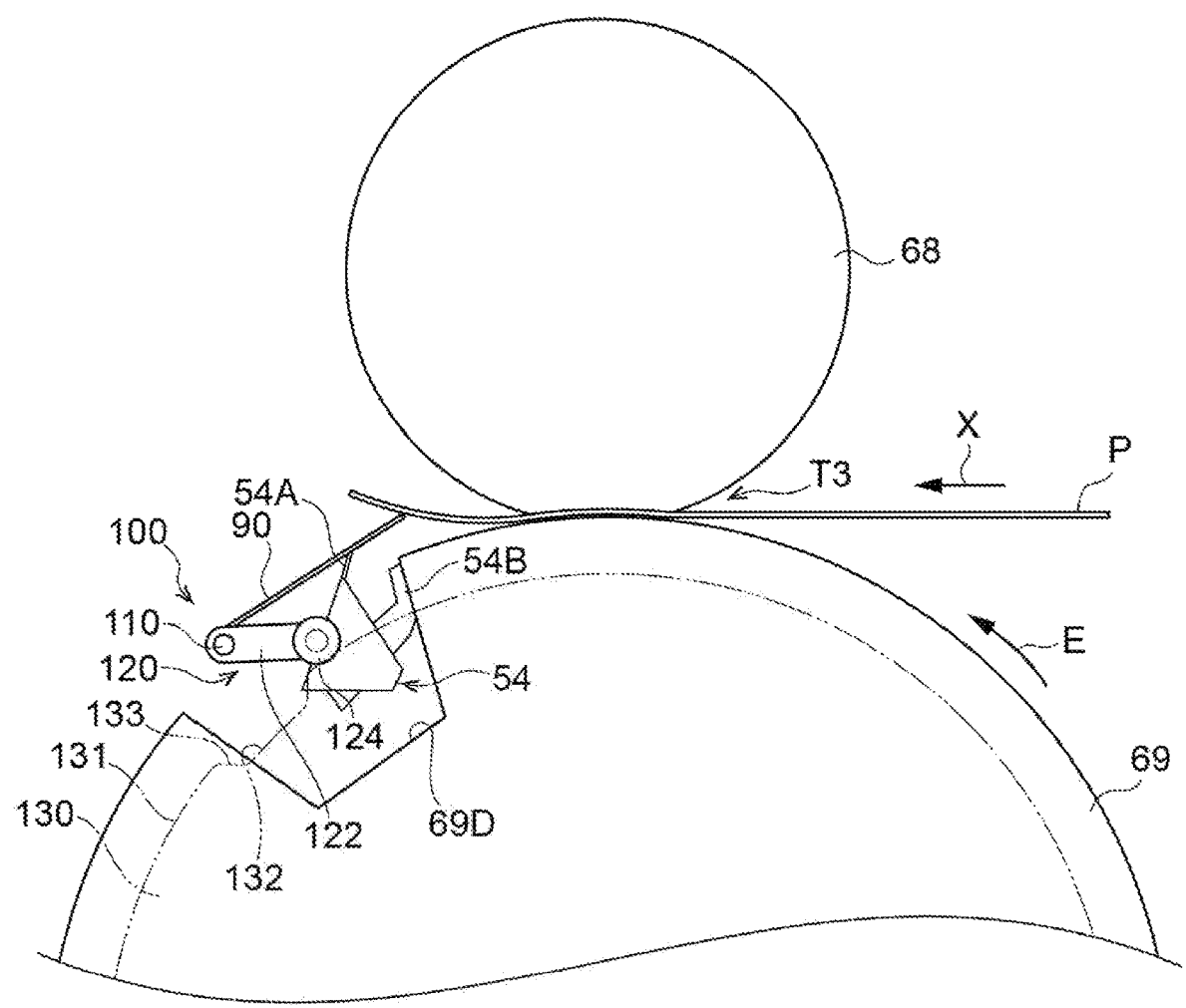
FIG. 10 is an operation diagram illustrating the operation of the guide plate and the gripper according to the present exemplary embodiment.

After the gripper 54 releases the holding of the recording medium P as illustrated in FIGS. 8 and 9, the guide plate 90 moves the front end of the recording medium P in a direction away from the pressing roller 69 to peel the recording medium P from the pressing roller 69 as illustrated in FIG. 10.

Specifically, as described below, the guide plate 90 lifts the front end of the recording medium P that passes between the pressing roller 69 disposed on a lower side and the heating roller 68 disposed on an upper side. As illustrated in FIG. 8, in a state where the guide plate 90 is located at the inner position, the gripper 54 releases the holding of the recording medium P. As illustrated in FIG. 9, when the recording medium P is conveyed while being nipped between the heating roller 68 and the pressing roller 69, and the front end of the recording medium P moves to a position above the guide plate 90, the guide plate 90 moves from the inner position to the outer position to lift the front end of the recording medium P as illustrated in FIG. 10. As described above, in the present exemplary embodiment, the guide plate 90 moves toward the outer side in the radial direction of the pressing roller 69 so as to move a tip end of the recording medium P toward the outer side in the radial direction of the pressing roller 69 after entering the recess 69D of the pressing roller 69.

Operation of Present Exemplary Embodiment

According to the image forming apparatus 10 (see FIG. 1) according to the present exemplary embodiment, the front end of the recording medium P sent from the first conveying body 11 is held by the gripper 54 of the conveying part 15. When the chain 52 rotates in the rotation direction C in a state where the gripper 54 holds the front end of the recording medium P, the gripper 54 is moved to convey the recording medium P, and causes the recording medium P to pass through the secondary transfer position T2. At the secondary transfer position T2, a toner image superimposed on the transfer belt 24 is transferred from the transfer belt 24 to the recording medium P.

The recording medium P to which the toner image is transferred is further conveyed by the conveying part 15 to pass between the heating unit 70 and the air-blowing part 80. At this time, the recording medium P is conveyed in a floating state by air sent from the air blower 84 of the air-blowing part 80. In the recording medium P, an unfixed image formed on the surface of the recording medium P is preheated in a non-contact manner by radiation heat of the heater 72 of the heating unit 70.

The preheated recording medium P is further conveyed to the fixing area T3 by the conveying part 15, and heated and pressed by the heating roller 68 and the pressing roller 69 so that the toner image is fixed.

In the present exemplary embodiment, as illustrated in FIG. 6, when the recess 69D of the pressing roller 69 moves to the position below the guide plate 90, the guide plate 90 moves to the inner position and enters the recess 69D as illustrated in FIG. 7.

On the other hand, after passing through the fixing area T3 together with the recording medium P while holding the recording medium P, the gripper 54 releases the holding of the recording medium P in a state where the guide plate 90 is located at the inner position as illustrated in FIG. 8.

Specifically, the gripper 54 releases the holding of the recording medium P before the claw 54A and the claw base 54B pass through the gap 96 between the guide portions 92 of the guide plate 90. More specifically, the gripper 54 releases the holding of the recording medium P after a portion of the gripper 54 excluding the claw 54A and the claw base 54B (that is, a portion of the gripper 54 on a downstream side in the conveying direction) enters a space 96.

As illustrated in FIG. 9, when the recording medium P is conveyed while being nipped between the heating roller 68 and the pressing roller 69, and the front end of the recording medium P moves to a position above the guide plate 90, the guide plate 90 moves from the inner position to the outer position to lift the front end of the recording medium P as illustrated in FIG. 10. At this time, the gripper 54 passes through the space 96 of the guide plate 90.

Here, in the present exemplary embodiment, as described above, the gripper 54 which moves by the rotation of the chain 52 passes the gap 96 between adjacent guide portions 92 of the guide plate 90. Therefore, interference between the gripper 54 and the guide plate 90 is suppressed as compared with a configuration (a first comparative example) using the guide plate 90 in which the gap 96 through which the gripper 54 passes is not provided.

In other words, in the present exemplary embodiment, the gripper 54 passes a position overlapping the guide portion 92 when viewed in the apparatus depth direction D but shifted in the apparatus depth direction D with respect to the guide portion 92, by the rotation of the chain 52. Therefore, interference between the gripper 54 and the guide plate 90 is suppressed as compared with a configuration (a second comparative example) in which the gripper 54 passes at a position overlapping the guide portion 92 as viewed in the apparatus depth direction D, which is the same position as the guide portion 92 in the apparatus depth direction D.

As described above, according to the configuration of the present exemplary embodiment, since the interference between the gripper 54 and the guide plate 90 is suppressed, a conveyance failure of the recording medium P is suppressed as compared with the first comparative example and the second comparative example. As a result, according to the configuration of the present exemplary embodiment, a fixing failure is suppressed and an image defect are suppressed as compared with the first comparative example and the second comparative example.

In the present exemplary embodiment, as described above, the plural guide portions 92 are disposed with the gap 96 provided between adjacent guide portions in the apparatus depth direction D (see FIG. 5). According to this configuration, the recording medium P is guided by the guide portion 92 on both sides in the apparatus depth direction D with respect to the gripper 54 passing through the gap 96. Therefore, the conveyance failure of the recording medium P is suppressed as compared with a configuration (a third comparative example) in which the guide portion 92 is provided only on one side of the space 96.

Figure 11:
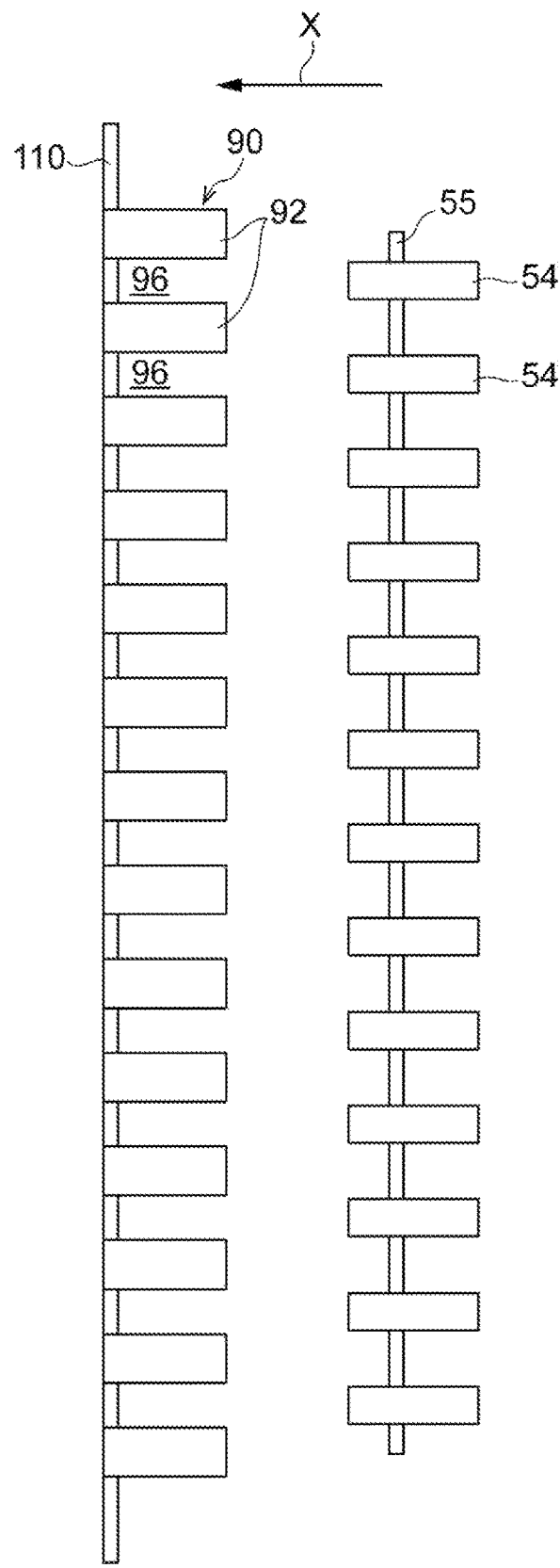
FIG. 11 is a plan view illustrating a guide plate according to a modification.

In the present exemplary embodiment, as described above, the connecting portion 94 and the plural guide portions 92 are formed of one component. Here, as illustrated in FIG. 11, in a configuration (a fourth comparative example) in which the guide portion 92 includes plural components, for example, it is necessary to attach each of the guide portions 92 to the shaft portion 110, and an attachment error is likely to occur in attaching the plural guide portions. In contrast, in the present exemplary embodiment, since the connecting portion 94 and the plural guide portions 92 are formed of one component, an attachment error is less likely to occur than in the fourth comparative example, and a conveyance failure of a material to be conveyed is suppressed.

In the present exemplary embodiment, as illustrated in FIG. 8, the gripper 54 releases the holding of the recording medium P before the claw 54A and the claw base 54B pass through the space 96 of the guide plate 90. Therefore, as compared with a configuration (a fifth comparative example) in which the claw 54A and the claw base 54B of the gripper 54 pass through the space 96 in a state of holding the recording medium P, contact of the recording medium P with the guide plate 90 is suppressed, and the conveyance failure of the recording medium P is suppressed.

In the present exemplary embodiment, as illustrated in FIG. 8, the portion of the gripper 54 on the downstream side in the conveying direction enters the space 96, and then the holding of the recording medium P is released. Therefore, as compared with a configuration (a sixth comparative example) in which holding of the recording medium P is released before the entire gripper 54 enters the space 96, the release of the holding of the recording medium P is performed in the vicinity of the guide portion 92. Accordingly, according to the configuration of the present exemplary embodiment, a posture of the recording medium P is less likely to change after the holding of the recording medium P is released, as compared with the sixth comparative example.

In the present exemplary embodiment, as illustrated in FIG. 8, the gripper 54 releases the holding of the recording medium P after the recording medium P passes through the fixing area T3. Therefore, as compared with a configuration (a seventh comparative example) in which the gripper 54 releases holding of the recording medium P before the recording medium P passes through the fixing area T3, the posture of the recording medium P is less likely to change after the holding of the recording medium P is released.

In the present exemplary embodiment, after the gripper 54 releases the holding of the recording medium P as illustrated in FIGS. 8 and 9, the guide plate 90 moves the front end of the recording medium P toward the outer side in the radial direction of the pressing roller 69 to peel the recording medium P from the pressing roller 69 as illustrated in FIG. 10. Therefore, as compared with a configuration (an eighth comparative example) in which the recording medium P is peeled without moving the recording medium P toward the outer side in the radial direction of the pressing roller 69, performance of peeling the recording medium P is improved.

In the present exemplary embodiment, the guide plate 90 moves toward the outer side in the radial direction of the pressing roller 69 so as to move the tip end of the recording medium P toward the outer side in the radial direction of the pressing roller 69 after entering the recess 69D of the pressing roller 69. As described above, the guide plate 90 enters under the recording medium P when the guide plate 90 enters the recess 69D of the pressing roller 69, and performance of peeling a material to be conveyed is improved as compared with a configuration (a ninth comparative example) in which the guide plate 90 peels the recording medium P outside the recess 69D of the pressing roller 69.

Modification of Holding Release Timing of Gripper 54

Although the gripper 54 releases the holding of the recording medium P after the recording medium P passes through the fixing area T3 as illustrated in FIG. 8 in the present exemplary embodiment, the present invention is not limited thereto. For example, the heating roller 68 and the pressing roller 69 may nip the recording medium P at the fixing area T3 after the gripper 54 releases the holding of the recording medium P.

According to this configuration, it is easy to correct a posture of the recording medium P by the heating roller 68 and the pressing roller 69, as compared with a configuration in which the gripper 54 releases the holding of the recording medium P after the recording medium P passes through the fixing area T3.

Although the holding of the recording medium P is released after the portion of the gripper 54 on the downstream side in the conveying direction enters the space 96 as illustrated in FIG. 8 in the present exemplary embodiment, the present invention is not limited thereto. For example, the holding of the recording medium P may be released before the entire gripper 54 enters the space 96.

Modification of Guide Plate 90

Figure 12:
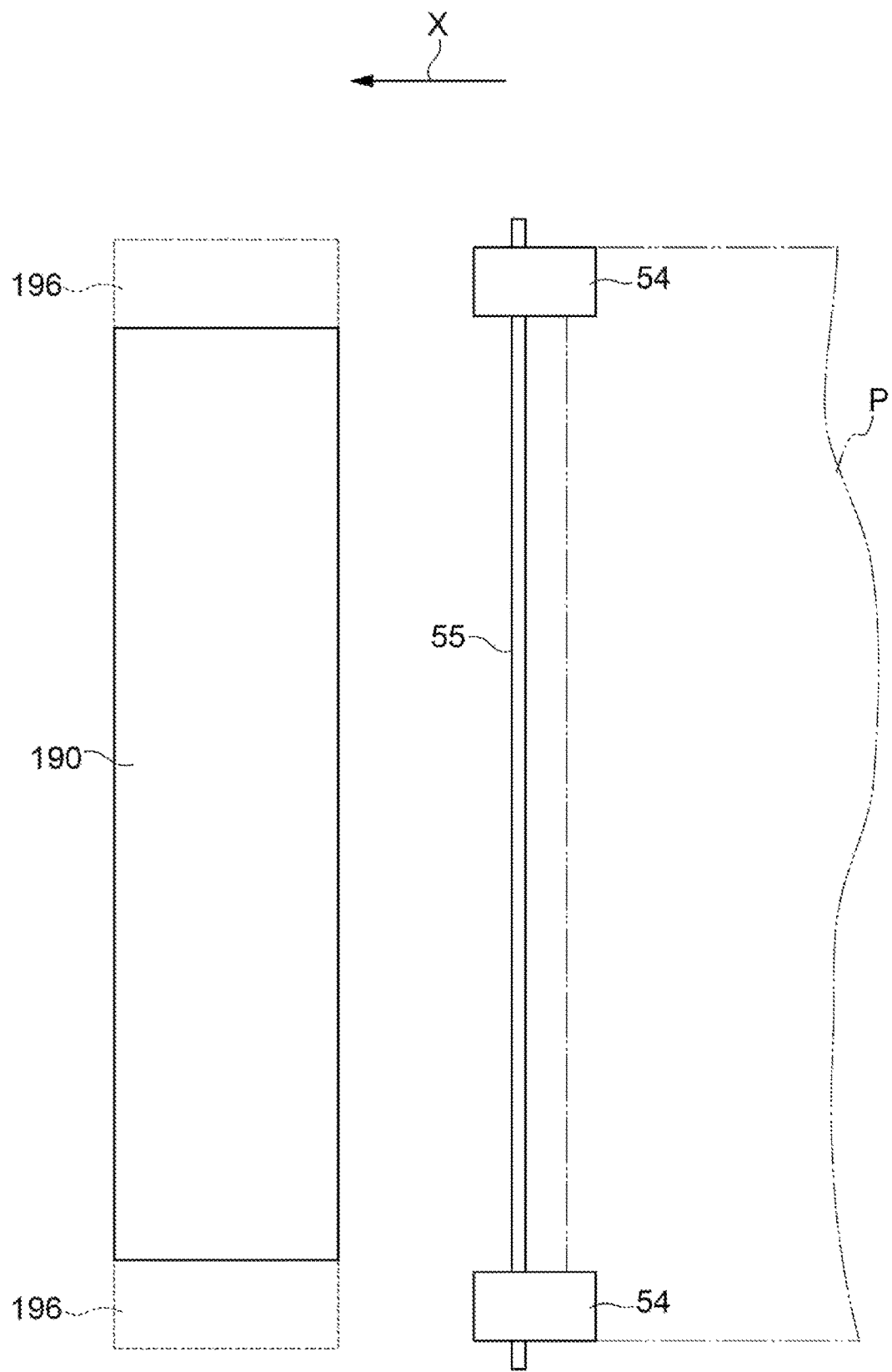
FIG. 12 is a plan view illustrating a guide plate and a gripper according to a modification.

Although the guide plate 90 is formed in a comb shape in a plan view in the present exemplary embodiment, the present invention is not limited thereto. For example, as illustrated in FIG. 12, a rectangular guide plate 190 may be adopted in which spaces 196 through which the grippers 54 pass are provided on both sides in the apparatus depth direction D (the intersecting direction intersecting the rotation direction of the chain 52). In other words, a width of the guide plate 90 in the apparatus depth direction D is narrower than the width of the recording medium P. In the configuration illustrated in FIG. 12, the grippers 54 are provided on both ends of the attachment member 55 in the apparatus depth direction D, and the grippers 54 that move by the rotation of the chain 52 pass through the spaces 196 in a manner of being separated from the guide plate 190 in the apparatus depth direction D. It can be said that the guide plate 190 has a configuration in which the guide portion is disposed only on one side with respect to the space 196 through which the gripper 54 passes.

Although the connecting portion 94 and the plural guide portions 92 are formed of one component as describe above in the present exemplary embodiment, the present invention is not limited thereto. For example, as illustrated in FIG. 11, the guide portion 92 may include plural components. In the configuration illustrated in FIG. 11, for example, each of the guide portions 92 is formed in a rectangular shape (strip shape), and all the guide portions 92 are attached to the shaft portion 110 corresponding to the connecting portion.

Other Modifications

Although an example in which the recording medium P is used as an example of the material to be conveyed has been described in the present exemplary embodiment, the present invention is not limited thereto. For example, as an example of the material to be conveyed may be used for being conveyed without for forming an image thereon.

Although the gripper 54 holds the front end of the recording medium P in the present exemplary embodiment, the present invention is not limited thereto. For example, the gripper 54 may be configured to hold a front end of the recording medium P from a side end of the recording medium P. The front end of the recording medium is a portion of the recording medium on a downstream side (front side) of a center in the conveying direction.

Although an example using the chain 52 as an example of the rotation part has been described in the present exemplary embodiment, the present invention is not limited thereto. For example, an example of the rotation part may use a rotation member such as a timing belt.

Although an example in which the pressing roller 69 is used as an example of the conveying roller has been described in the present exemplary embodiment, the present invention is not limited thereto. As an example of the conveying roller, for example, a roller for a purpose other than a purpose of performing pressing, such as a transfer roller or the like for transferring an image to a material to be conveyed, a conveying roller for a purpose of only conveying a material to be conveyed, or the like may be used.

Although an example in which the heating roller 68 is used as an example of the nip portion has been described in the present exemplary embodiment, the present invention is not limited thereto. As an example of the nip portion, a conveying body such as a heating belt (fixing belt) or a heating pad (fixing pad) may be used. As an example of the nip portion, for example, a nip portion for a purpose other than a purpose of performing heat, such as a transfer body or the like for transferring an image to a material to be conveyed, a conveying body for a purpose of only conveying a material to be conveyed, or the like may be used.

Although an example in which a fixing device that heats a toner image is used as an example of the heating device has been described in the present exemplary embodiment, the present invention is not limited thereto. As an example of the heating device, for example, a drying device that dries moisture of ink by heating the recording medium P onto which the ink is ejected, or a drying device that dries carrier oil of a liquid developer by heating the recording medium P onto which a toner image is transferred by the liquid developer may be used.

The image forming apparatus 10 of the present exemplary embodiment may be configured as an image forming apparatus that forms an image on both surfaces of the recording medium P. Example of the image forming apparatus that forms an image on both surfaces of the recording medium P, may have a configuration in which the front and back of the recording medium P are reversed after an image transferred to one surface of the recording medium P is fixed by the fixing device 16, and the recording medium is conveyed to the secondary transfer position T2, and an image is transferred and fixed to the other surface of the recording medium P.

Although the conveying part 15 according to the present exemplary embodiment conveys the recording medium P in the horizontal direction, the present invention is not limited thereto. For example, the conveying part 15 may be configured to convey the recording medium P in a vertical direction or an oblique direction with respect to the horizontal direction.

The present invention is not limited to the above-described exemplary embodiment, and various modifications, changes, and improvements are possible without departing from the gist of the present invention. For example, plural modifications described above may be combined as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing device comprising:
   a rotator to which a holder is attached so that a material to be conveyed is held, wherein the rotator rotates in a circumferential direction to convey the material to be conveyed;
   a conveying roller to convey the material to be conveyed, wherein the conveying roller includes a recess for accommodating the holder;
   a guide member comprising
      a guider that guides the material to be conveyed on a downstream side of the conveying roller, and
      a space in an intersecting direction intersecting the circumferential direction with respect to the guider, the space being where the holder moving by rotation of the rotation part passes through; and
   a nip portion that has a nip area that nips the material to be conveyed between the conveying roller and a roller facing to the conveying roller or a belt facing to the conveying roller,
   wherein the holder releases holding of the material to be conveyed after a front end of the material to be conveyed passes through the nip area.

2. The fixing device according to claim 1,
   wherein a plurality of the guiders are in the guide member with the space between the plurality of the guiders in the intersecting direction.

3. The fixing device according to claim 2,
   wherein the guide member comprises a connecting portion that connects the plurality of the guiders in the intersecting direction on a downstream side of the plurality of the guiders, and the connecting portion and the plurality of the guiders are one component.

4. The fixing device according to claim 1, wherein
   the holder comprises a holding portion that holds the material to be conveyed, and releases holding of the material to be conveyed before the holding portion passes through the space, and
   the holder releases the holding of the material to be conveyed after a portion of the holder except for the holding portion enters the space.

5. The fixing device according to claim 2, wherein
   the holder comprises a holding portion that holds the material to be conveyed, and releases holding of the material to be conveyed before the holding portion passes through the space, and
   the holder releases the holding of the material to be conveyed after a portion of the holder except for the holding portion enters the space.

6. The fixing device according to claim 3, wherein
   the holder comprises a holding portion that holds the material to be conveyed, and releases holding of the material to be conveyed before the holding portion passes through the space, and
   the holder releases the holding of the material to be conveyed after a portion of the holder except for the holding portion enters the space.

7. The fixing device according to claim 4,
   wherein the holder releases holding of the material to be conveyed after a front end of the material to be conveyed passes through the nip area.

8. The fixing device according to claim 4,
wherein the nip area is configured to nip the material to be conveyed between the nip area and the conveying roller after the holder releases holding of the material to be conveyed.

9. The fixing device according to claim 4,
wherein the guide member is configured to move the front end of the material to be conveyed toward an outer side in a radial direction of the conveying roller to peel the material to be conveyed from the conveying roller after the holder releases holding of the material to be conveyed.

10. The fixing device according to claim 9, further comprising:
a mechanism that moves the guide member toward the outer side in the radial direction of the conveying roller after the guide member enters the recess.

11. The fixing device according to claim 10,
wherein the moving mechanism comprises
a cam having a recess in an outer peripheral portion of the cam and configured to rotate together with the conveying roller, and
a cam follower having
one end to which the guide member is fixed and the other end being in contact with an outer peripheral surface of the cam and configured to move in a radial direction of the cam.

12. A fixing device comprising:
a rotator to which a holder is attached so that a material to be conveyed is held, wherein the rotator rotates in a circumferential direction to convey the material to be conveyed;
a conveying roller that is provided with a recess for accommodating the holder to convey the material to be conveyed;
a guider that guides the material to be conveyed on a downstream side of the conveying roller; and
a nip portion that has a nip area that nips the material to be conveyed between the conveying roller and a roller facing to the conveying roller or a belt facing to the conveying roller, wherein
the holder is configured to pass a position overlapping the guider when viewed from an intersecting direction intersecting the circumferential direction and shifted in the intersecting direction with respect to the guider, by rotation of the rotation part, and
the holder releases holding of the material to be conveyed after a front end of the material to be conveyed passes through the nip area.

13. An image forming apparatus comprising:
a forming unit configured to form an image on a recording medium as the material to be conveyed; and
the fixing device according to claim 1 configured to fix the image on the recording medium on which the image is formed by the forming unit.

* * * * *